United States Patent
Lakshmanan et al.

(10) Patent No.: US 9,440,324 B2
(45) Date of Patent: Sep. 13, 2016

(54) ANGLE VALVE WITH HAMMERLESS GRINDING

(71) Applicant: Bray International, Inc., Houston, TX (US)

(72) Inventors: Varadharajen Lakshmanan, Bangalore (IN); Mathew Varghese, Bangalore (IN); Karthikeyan Rajan, Bangalore (IN); Laural Marshall, Bangalore (IN)

(73) Assignee: Bray International, Inc., Houston, TX (US)

( * ) Notice: Subject to any disclaimer, the term of this patent is extended or adjusted under 35 U.S.C. 154(b) by 120 days.

(21) Appl. No.: 14/273,758

(22) Filed: May 9, 2014

(65) Prior Publication Data

US 2014/0332089 A1 Nov. 13, 2014

Related U.S. Application Data

(60) Provisional application No. 61/821,625, filed on May 9, 2013.

(51) Int. Cl.
*F16K 29/00* (2006.01)
*B24B 1/00* (2006.01)
*B24B 15/03* (2006.01)

(52) U.S. Cl.
CPC .................. *B24B 1/00* (2013.01); *B24B 15/03* (2013.01); *F16K 29/00* (2013.01); *Y10T 137/0435* (2015.04)

(58) Field of Classification Search
CPC ....................................................... B24B 1/00
USPC ......... 137/243.1, 243, 243.6, 243.2; 384/129
See application file for complete search history.

(56) References Cited

U.S. PATENT DOCUMENTS

| | | | |
|---|---|---|---|
| 1,991,621 A | * | 2/1935 | Noll ........................ F16K 29/00 137/243.1 |
| 4,338,961 A | | 7/1982 | Karpenko |
| 4,678,002 A | | 7/1987 | Valley |
| 4,922,950 A | | 5/1990 | Taylor |

(Continued)

FOREIGN PATENT DOCUMENTS

| | | |
|---|---|---|
| CN | 102748484 A | 10/2012 |
| WO | 2011083432 A1 | 7/2011 |

(Continued)

OTHER PUBLICATIONS

GGB Bearing Technology, DU/DUB Dry Bearings, 2008, 55 pages, France.

(Continued)

*Primary Examiner* — John K Fristoe, Jr.
*Assistant Examiner* — Paul Gray
(74) *Attorney, Agent, or Firm* — Mark Oathout; Oathout Law Firm

(57) ABSTRACT

In an angle valve, an externally threaded sleeve within the yoke surrounds the stem at an upper end of the stem. A yoke bushing fixed to the valve has internal threads matching with the external threading of the sleeve. A split collar assembly is located on the stem above the sleeve. The stem has a greater diameter itself, and/or via a nut, at a lower portion of the stem (below the sleeve) relative to the upper portion of stem. The plug stem is designed to pass through the yoke bushing making it possible to perform the normal open-close operation and grinding operation independently.

9 Claims, 16 Drawing Sheets

(56) References Cited

U.S. PATENT DOCUMENTS

| | | |
|---|---|---|
| 6,273,121 B1 | 8/2001 | Usabiaga |
| 2008/0315138 A1 | 12/2008 | Hardie et al. |

FOREIGN PATENT DOCUMENTS

| | | |
|---|---|---|
| WO | 2012042301 A1 | 4/2012 |
| WO | 2012042304 A1 | 4/2012 |
| WO | 2012042306 A1 | 4/2012 |
| WO | 2012042310 A1 | 4/2012 |
| WO | 2012042312 A1 | 4/2012 |
| WO | 2012042313 A1 | 4/2012 |
| WO | 2012046101 A1 | 4/2012 |
| WO | 2012046102 A1 | 4/2012 |
| WO | 2012046105 A1 | 4/2012 |
| WO | 2012046106 A1 | 4/2012 |
| WO | 2012046107 A1 | 4/2012 |
| WO | 2012046108 A1 | 4/2012 |

OTHER PUBLICATIONS

Choi, Hyun Goo, International Search Report, Sep. 2, 2014, 3 pages, Korean Intellectual Property Office, Republic of Korea.

Choi, Hyun Goo, Written Opinion of the International Searching Authority, Sep. 2, 2014, 10 pages, Korean Intellectual Property Office, Republic of Korea.

* cited by examiner

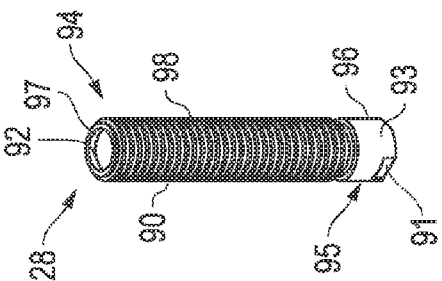
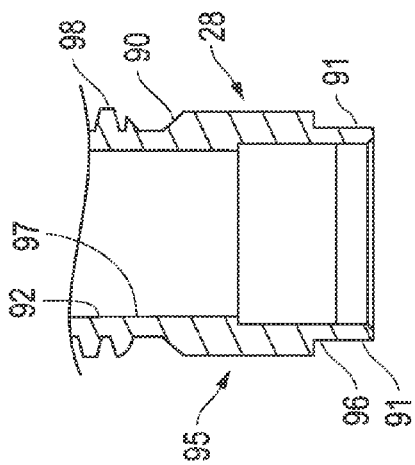
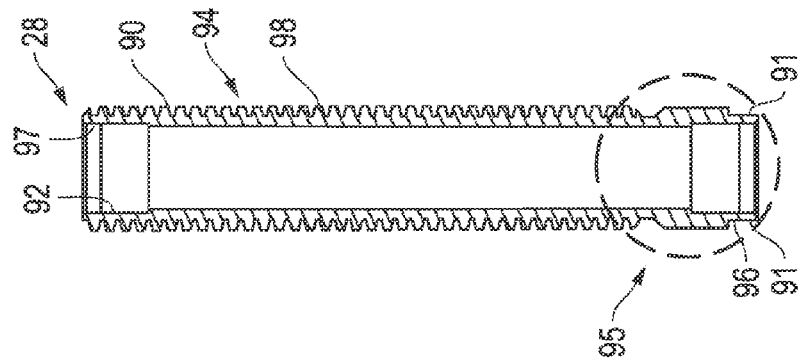
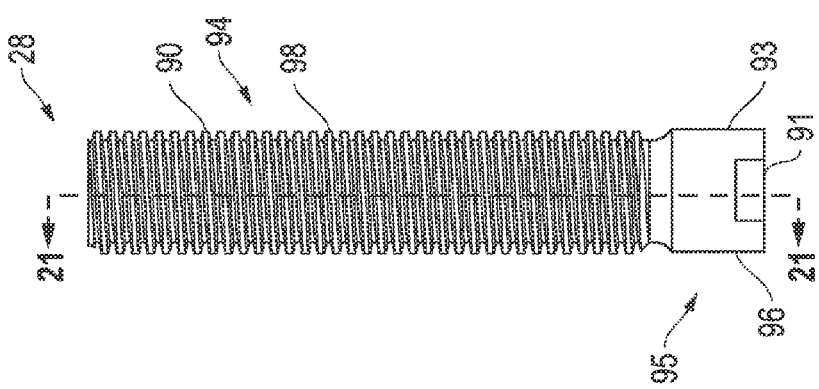

ANGLE VALVE WITH HAMMERLESS GRINDING

CROSS-REFERENCE TO RELATED APPLICATIONS

This application claims the benefit of U.S. Provisional Application No. 61/821,625 filed May 9, 2013 (which is herein incorporated by reference).

STATEMENTS REGARDING FEDERALLY SPONSORED RESEARCH OR DEVELOPMENT

Not Applicable.

NAMES OF THE PARTIES TO A JOINT RESEARCH AGREEMENT

Not Applicable.

REFERENCE TO A "SEQUENCE LISTING", A TABLE, OR A COMPUTER PROGRAM

Not Applicable.

BACKGROUND

Technical Field

Angle valves are designed and manufactured for the alumina refinery, where these valves have to withstand erosive and scaling media. Scale formation is an inherent phenomenon of a slurry media. Angle valves are equipped with features to enable grinding of scales between the seat and the closure member or plug. Exemplary embodiments disclosed herein relate to angle valves and the removal or grinding of scale from same.

Angle valves are commonly used process isolation valves for slurry media in an alumina refinery which involves highly erosive and scaling media. Scales deposited on the seat surfaces are removed by grinding the closure member against the seat without dismantling the valve.

The valve is operated by rotating a yoke bush which in turn drives the plug stem up or down axially towards the seat or away from the seat. The yoke bush is torqued either by a hand wheel or a gear box.

The seat grinding operation is performed by locking the plug stem and yoke bushing to make it integral so that the axial movement is prevented. The torque applied on the hand wheel or gear drive rotates the plug stem which is loaded on to the scale built up on the seat surface resulting in removal of scales.

The locking of the plug stem and bushing is performed by applying considerable force on a stem jam nut which jams the threads on the plug stem and yoke bushing to act as an integral component. The force is applied by use of hammers by workers which potentially results in injury to the person or potentially may cause damage to the valve components.

The industry demands a solution which can eliminate the use of hammers to lock up the jam nut on the plug stem and yoke bushing while switching to scale grinding mode.

BRIEF SUMMARY

The solution utilizes a modified plug stem with a new external threaded sleeve and yoke bushing in the angle valve. The stem passes through the external threaded sleeve guided via radial bearings making it possible to rotate freely inside the sleeve. The external threads on the sleeve are engaged in a yoke bushing which drives the stem up or down axially in normal open-close mode operated by a hand wheel or gear box. The sleeve is guided on the yoke with a stem clamp arrangement which acts as the anti-rotation mechanism. The plug stem is designed to pass through the yoke bushing making it possible to perform the normal open-close operation and grinding operation independently.

The seat scale grinding operation can be performed by applying torque on the stem handle or alternatively by using a power operated torque wrench which can be coupled on the hexagon drive provided at the end of the plug stem thereby completely eliminating the use of jam nut to lock the plug stem and yoke bushing resulting in improved safety for workers and longer life of valves.

BRIEF DESCRIPTION OF THE SEVERAL VIEWS OF THE DRAWINGS

The exemplary embodiments may be better understood, and numerous objects, features, and advantages made apparent to those skilled in the art by referencing the accompanying drawings. These drawings are used to illustrate only exemplary embodiments of this invention, and are not to be considered limiting of its scope, for the invention may admit to other equally effective exemplary embodiments. The figures are not necessarily to scale and certain features and certain views of the figures may be shown exaggerated in scale or in schematic in the interest of clarity and conciseness.

FIG. 20 shows a front or elevation view of an exemplary embodiment of a stem sleeve of an angle valve.

FIG. 21 shows a cross section view taken along line 21-21 of the exemplary embodiment of the stem sleeve of FIG. 20.

FIG. 22 shows an enlarged view of the lower portion of the exemplary embodiment of the stem sleeve as shown in FIG. 21.

FIG. 23 shows a perspective view of an exemplary embodiment of the stem sleeve.

DESCRIPTION OF EXEMPLARY EMBODIMENT(S)

The description that follows includes exemplary apparatus, methods, techniques, and instruction sequences that embody techniques of the inventive subject matter. However, it is understood that the described exemplary embodiments may be practiced without these specific details.

Figure 1:
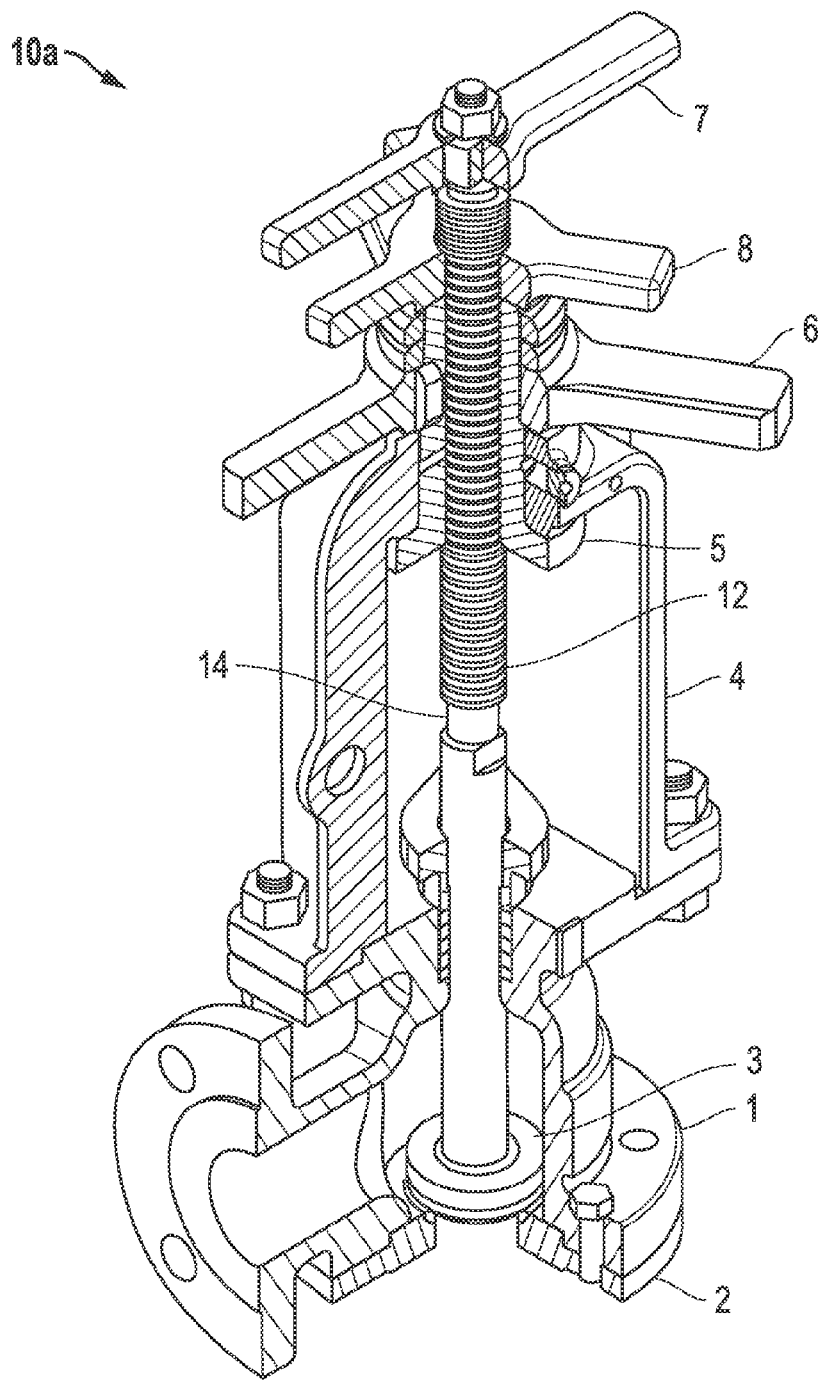
FIG. 1 is a cross sectioned perspective view of a handle operated angle slurry valve.
Figure 2:
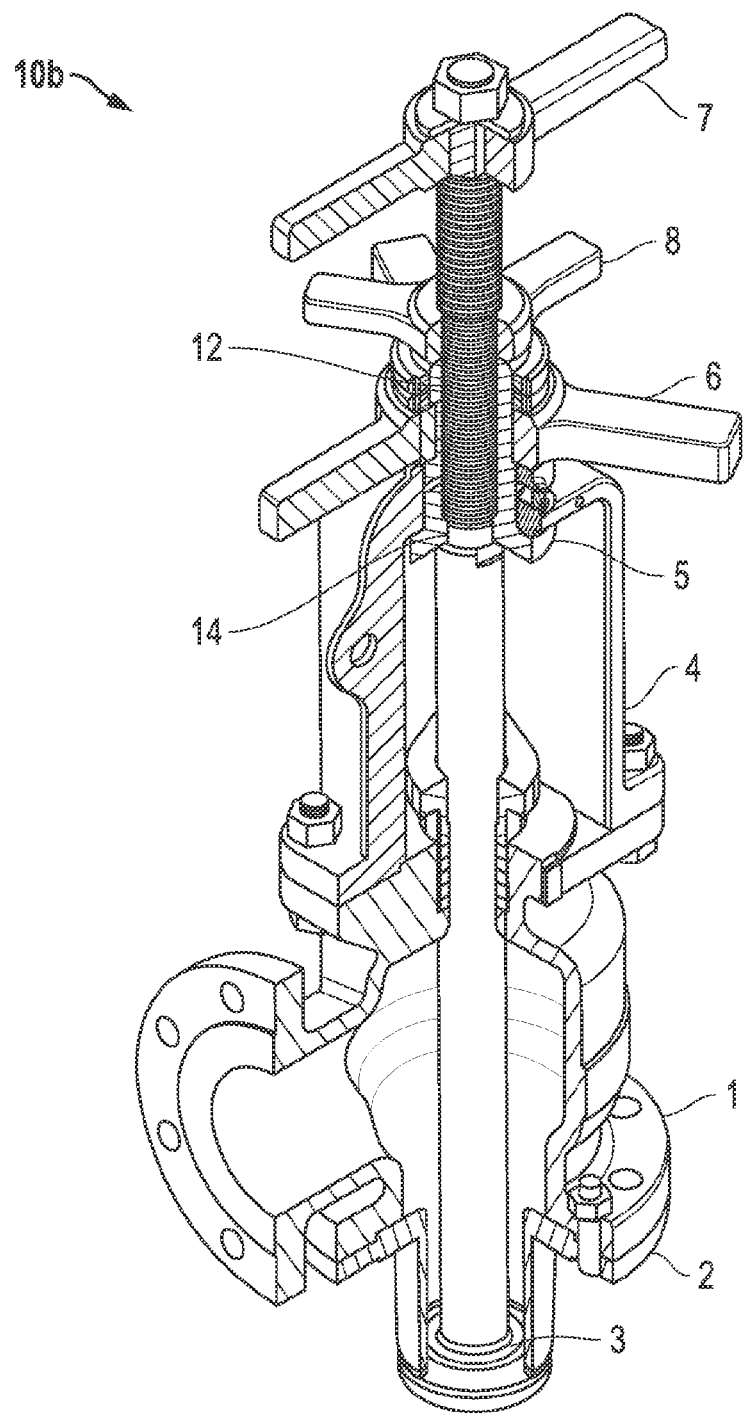
FIG. 2 is a cross sectioned perspective view of a handle operated angle bayonet valve.

FIG. 1 and FIG. 2 show a cross-sectional view of an angle slurry valve 10a and an angle bayonet valve 10b respectively.

The valves 10a and/or 10b are designed to open and close a plug 3 movable axially towards or away from the valve seat 2 which may be mounted on a flange 1 positioned at the inlet of the flow. The external threads 12 provided on the plug 3 stem 14 engage in the yoke bushing 5 which is guided inside the yoke 4. Yoke bushing 5 is rotated by a yoke bushing handle 6 which are coupled together. The stem jam nut 8 is engaged on the stem 14 external threads 12. The outer end of the stem 14 is coupled with a grinding handle 7.

For the normal open-close operation, the yoke bushing handle 6 is rotated which is coupled to the yoke bushing 5 which drives the plug stem 14 axially up or down. The required seat load for tight shut-off is attained by applying torque on yoke bushing handle 6.

For grinding operation, the plug 3 is seated on the valve seat 2 using the open-close operation mentioned above. The stem jam nut 8 is tightened against the yoke bushing 5 to jam the threads of yoke bushing 5 and plug stem 14 together which makes the yoke bushing 5, plug stem 14 and stem jam nut 8 to act as one integral component. Rotating the yoke bushing handle 6 or grinding handle 7 will make the plug 3 rotate and grind against the scale built up on the seat 2 surface without any axial movement.

Figure 1A:
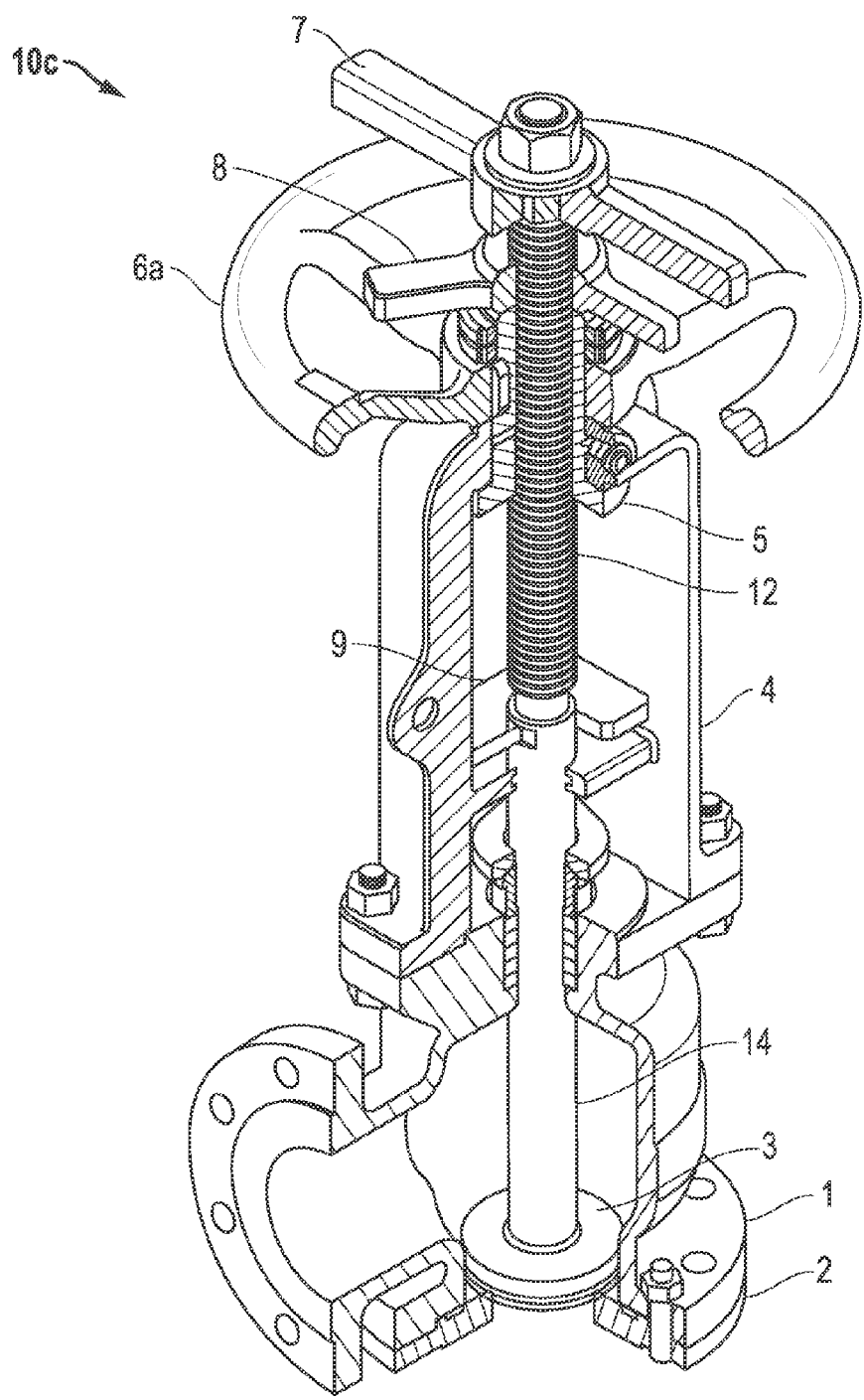
FIG. 1A is a cross sectioned perspective view of a hand wheel operated angle slurry valve.
Figure 2A:
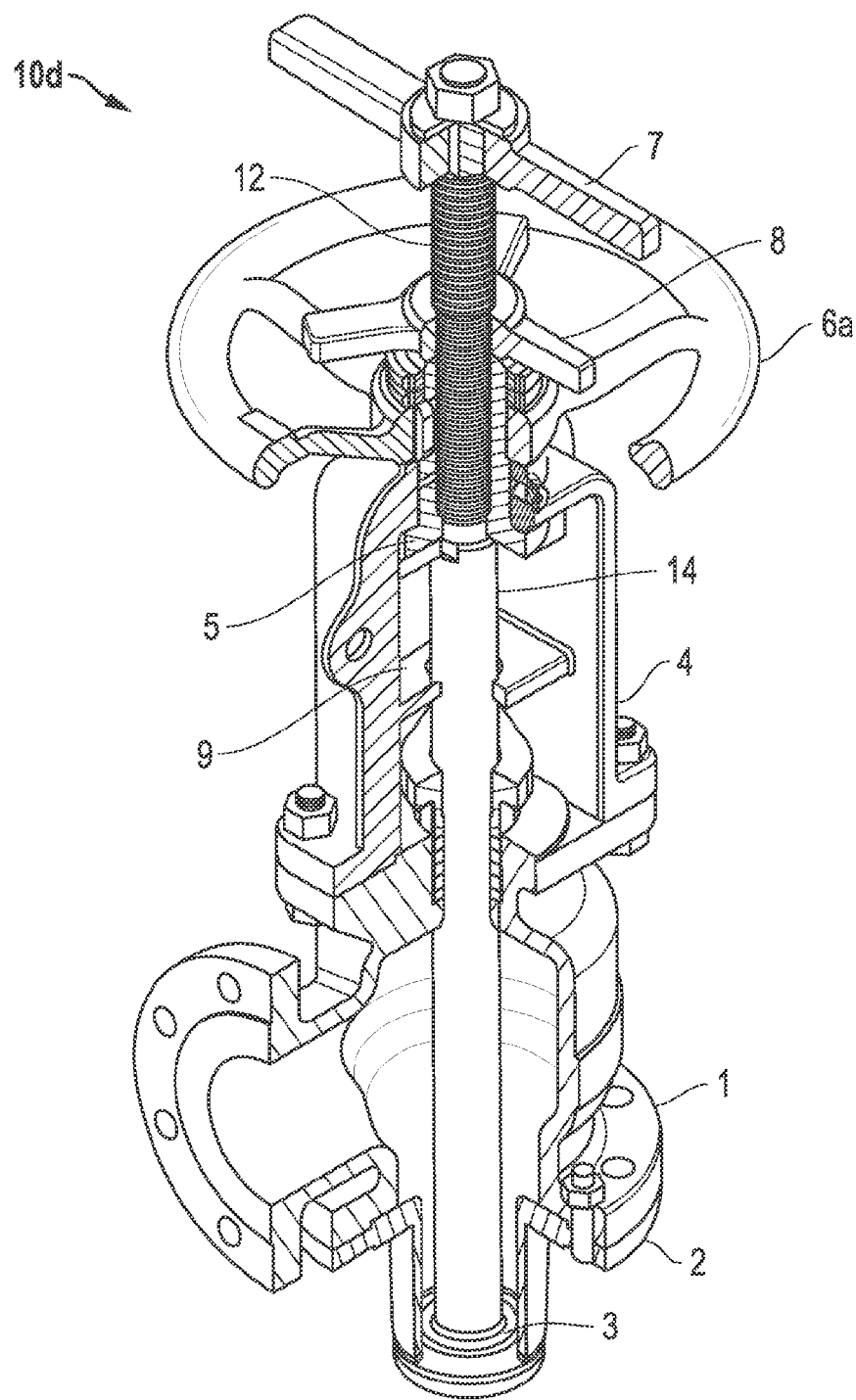
FIG. 2A is a cross sectioned perspective view of a hand wheel operated angle bayonet valve.

FIG. 1A and FIG. 2A show a cross sectioned perspective view of a hand wheel operated angle slurry valve 10c and angle bayonet valve 10c respectively. FIG. 1A and FIG. 2A are similar to the angle valves 10a, 10b of FIGS. 1 and 2, respectively, except that the yoke bushing handle 6 is replaced with a yoke bushing hand wheel 6a, and that an anti-rotational component 9 has been added, The anti-rotational component 9 must be removed in the angle slurry valve 10c and angle bayonet valve 10d prior to grinding scale off the surface of the seat 2.

Figure 3:
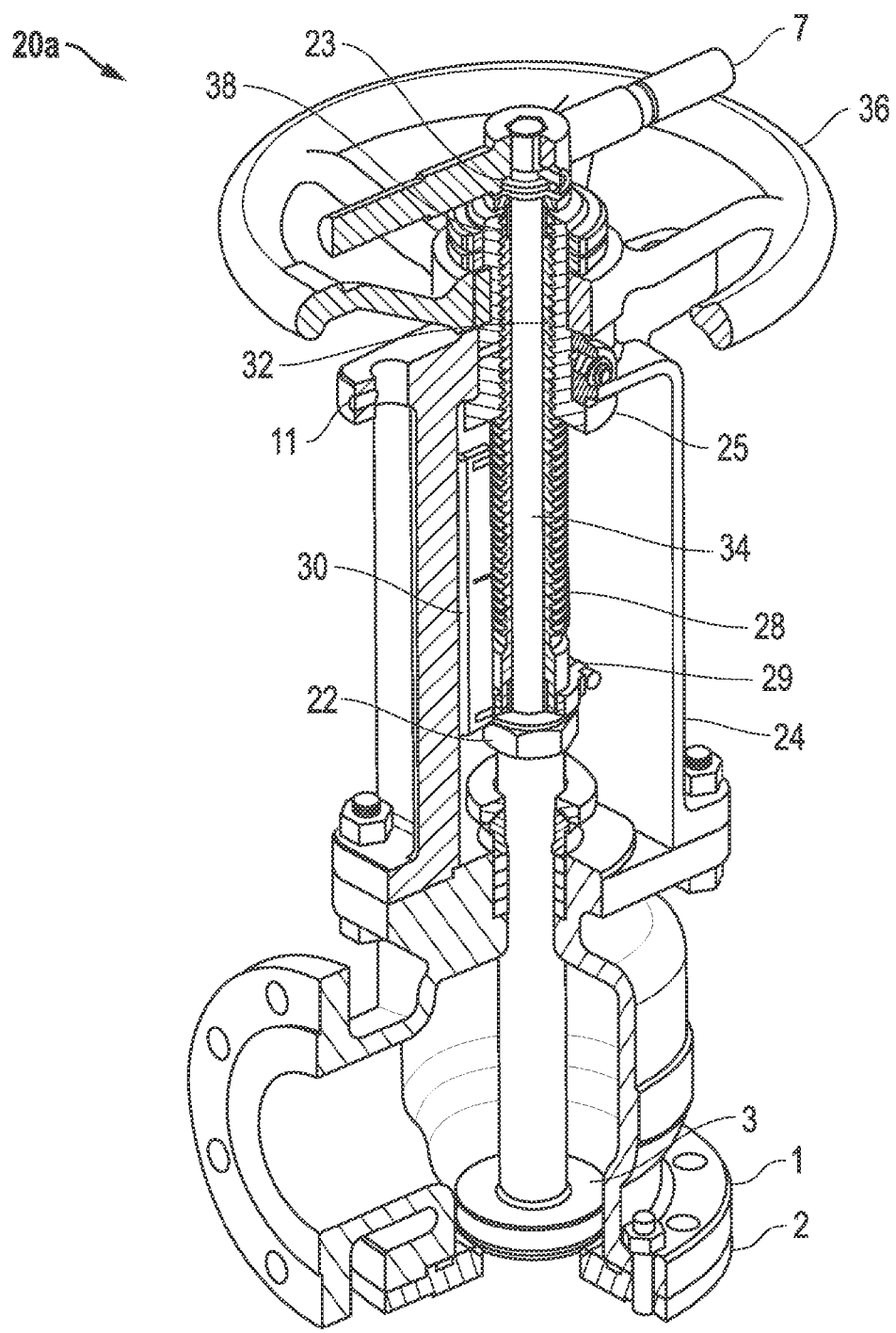
FIG. 3 is a cross sectioned perspective view of an exemplary embodiment of an angle slurry valve.
Figure 4:
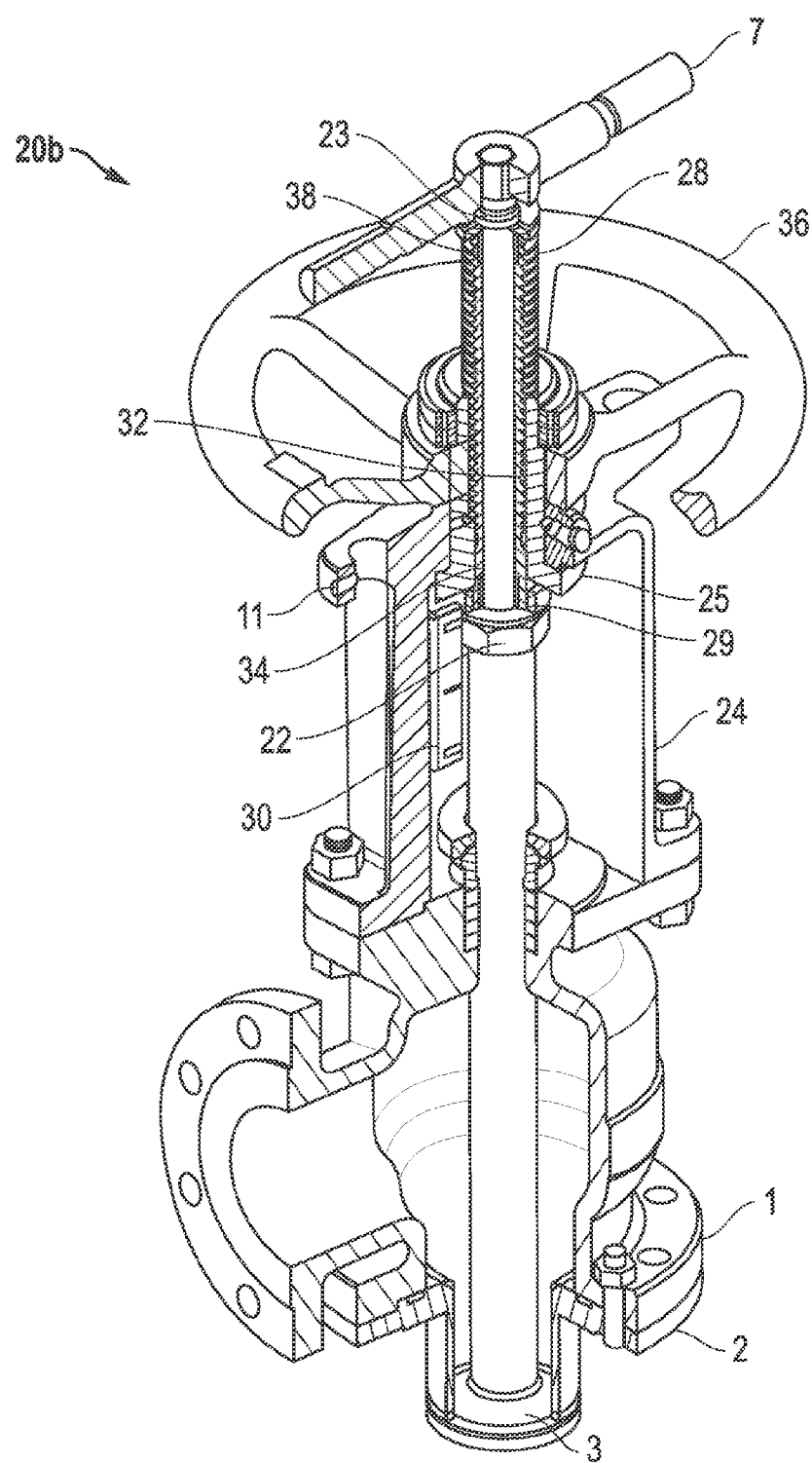
FIG. 4 is a cross sectioned perspective view of an exemplary embodiment of an angle bayonet valve.

FIG. 3 and FIG. 4 show a cross-sectional view of other embodiments of an angle slurry valve 20a and angle bayonet valve 20b respectively incorporating improvements as discussed below.

The embodiments of FIG. 3 and FIG. 4 use a modified plug 3 stem 34 passing through an external threaded stem sleeve 28 which is engaged in the yoke bushing 25 threads 32. The upper and lower ends of the stem sleeve 28 are provided with radial bearings 38. This arrangement makes it possible for the stem 34 to rotate freely inside the stem sleeve 28. By way of example only, commercially suitable radial bearings 38 which may be utilized include radial bearings available from GARLOCK, GGB BEARINGS and/or others. This design is also provided with a stroke scale plate 30 which is bolted on the yoke 24 and an anti-rotational component or stem clamp 29 which is tightened on the stem sleeve 28. Stroke positions for 0%, 50% and 100% openings are engraved on the plate 30 on which the stem clamp 29 pointer will be guided to indicate the plug 3 position.

For the normal open-close operation, the yoke bushing hand wheel 36 is rotated which is coupled to the yoke bushing 25 which drives the stem sleeve 28 axially up or down. The sleeve 28 in turn pushes the plug 3 towards or away from the seat 2. The thrust from the sleeve 28 is transferred to the plug 3 by a threaded nut 22 on the lower side, and by a split collar assembly 23 on the upper side. The required seat load for tight shut-off is attained by applying torque on yoke bushing hand wheel 36.

For grinding operation, the plug 3 is seated on the valve seat 2 using the open-close operation mentioned above. The load on seat scale surface is adjusted by the hand wheel 36 to keep the grinding torques within the maximum possible torque which can be applied by the worker on the grinding handle 7.

On rotating the grinding handle 7, the scale built up on the seat 2 surfaces will be ground off. As the layers of scale are removed, the hand wheel 36 is torqued again to apply the required load on seat scale surface and grinding process is repeated.

Figure 5:
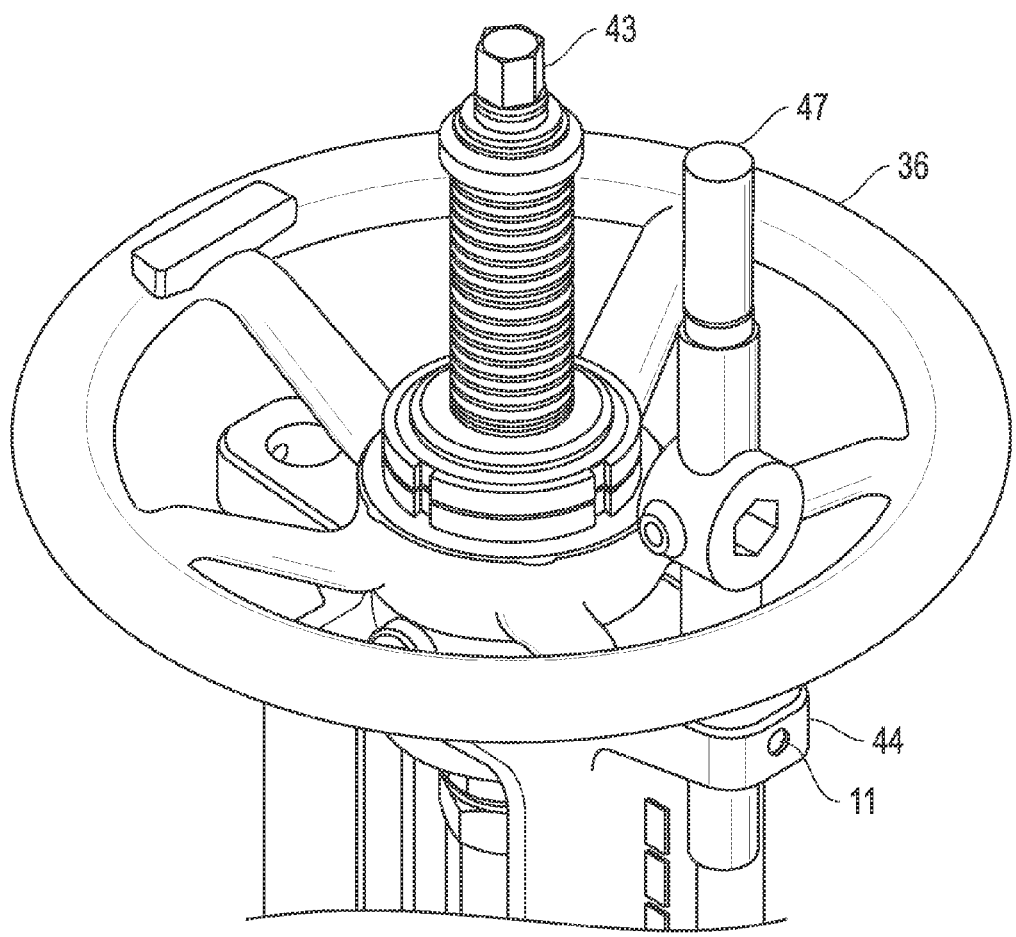
FIG. 5 is a perspective view showing the setting for grinding operation with pneumatic torque wrench.
Figure 6:
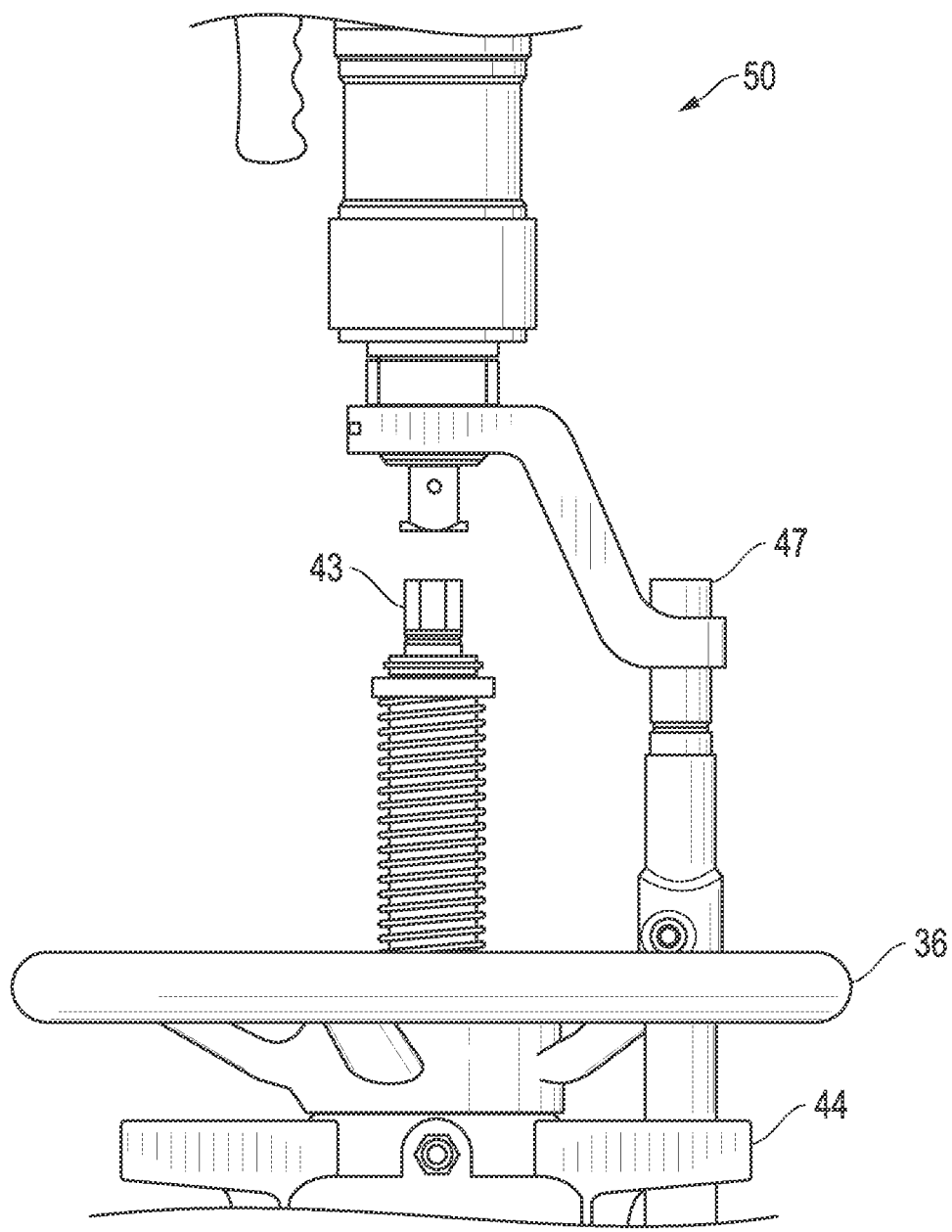
FIG. 6 shows the pneumatic torque wrench attachment for grinding.

FIG. 5 and FIG. 6 illustrate another embodiment or setting of a grinding handle 47 for attaching power operated torque wrench. The plug stem 43 shown in FIG. 5 is provided with a standard hexagonal profile at the free end to which the torque machines can be coupled. The grinding handle 47 is pulled out from the plug stem 43 and inserted into the matching hole in the yoke 44 which is retained in position by a spring plunger 11. The grinding handle 47 in this setting acts as a support for the reaction foot of the torque machine 50.

Figure 7:
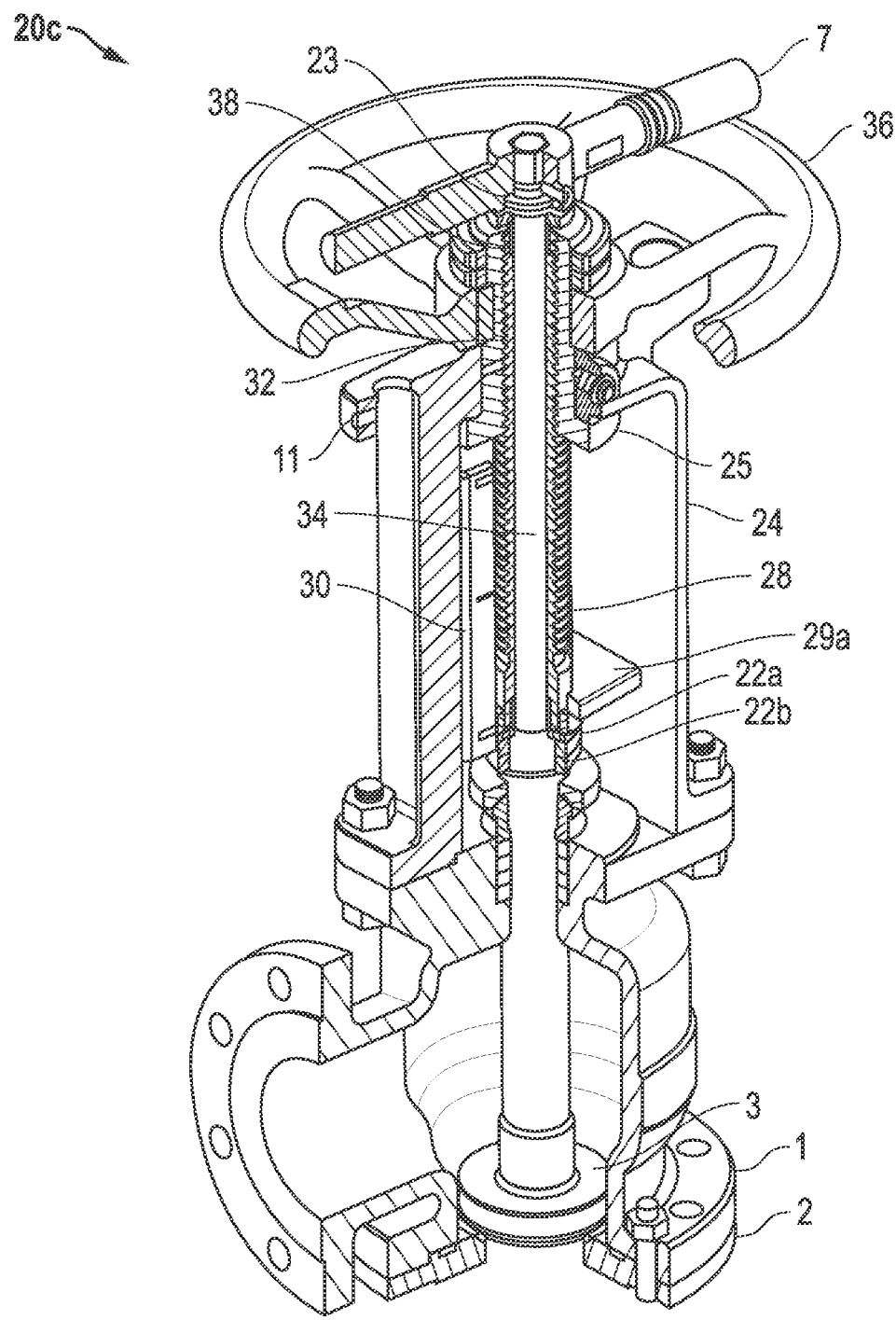
FIG. 7 is a cross sectioned perspective view of another exemplary embodiment of an angle slurry valve.
Figure 8:
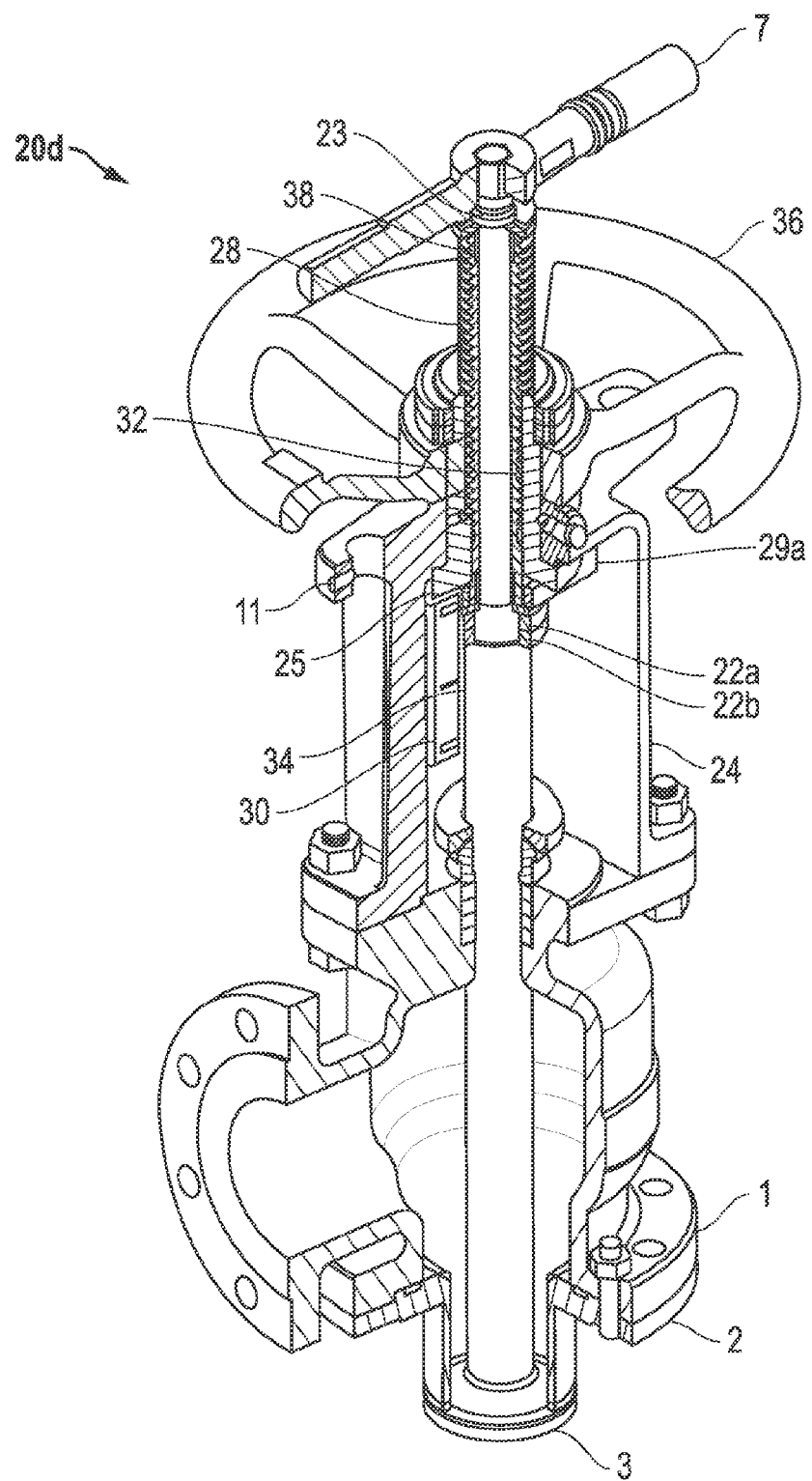
FIG. 8 is a cross sectioned perspective view of another exemplary embodiment of an angle bayonet valve.

FIG. 7 and FIG. 8 show a cross sectioned perspective view of an exemplary embodiment of an angle slurry valve 20c and an angle bayonet valve 20d respectively. FIG. 7 and FIG. 8 are similar to the exemplary embodiments of FIGS. 3 and 4 except that the shape of aforementioned stem clamp 29 is changed to the shape of stem clamp 29a (as can be seen in more detail in FIGS. 11-13), and that the threaded nut 22 of FIGS. 3 and 4 may be two threaded nuts 22a and 22b as seen on FIGS. 7 and 8.

Figure 9:
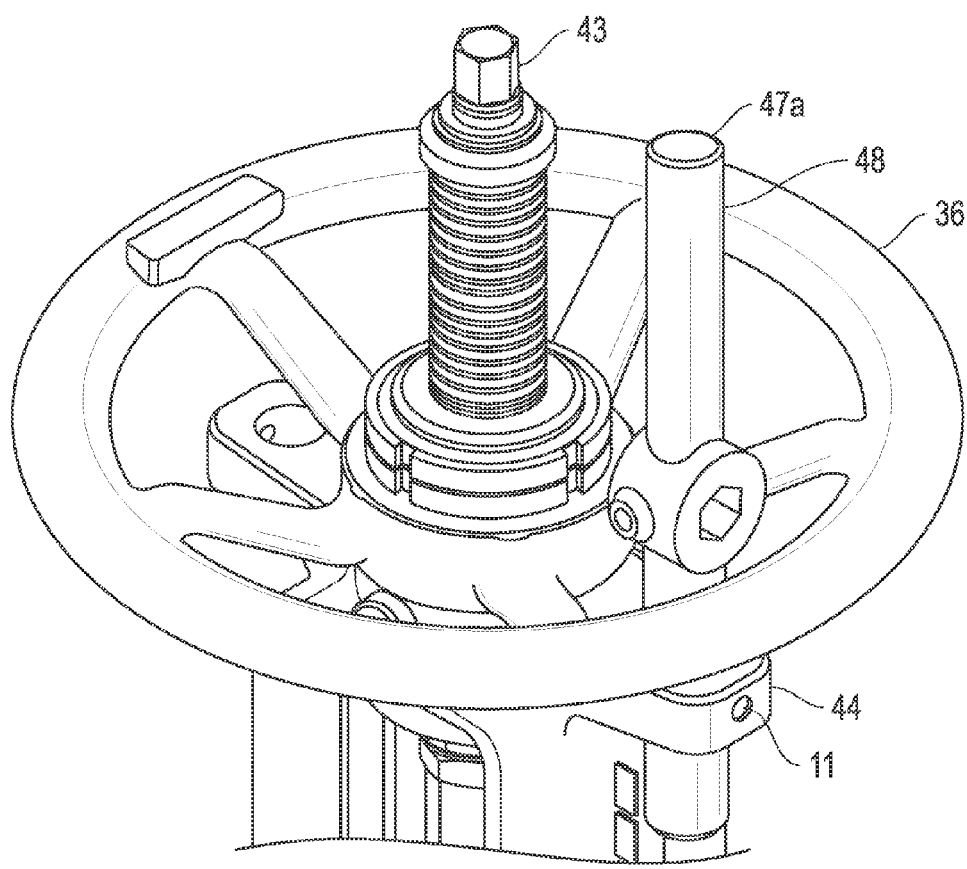
FIG. 9 is a perspective view of another exemplary embodiment showing the setting for grinding operation with pneumatic torque wrench.
Figure 10:
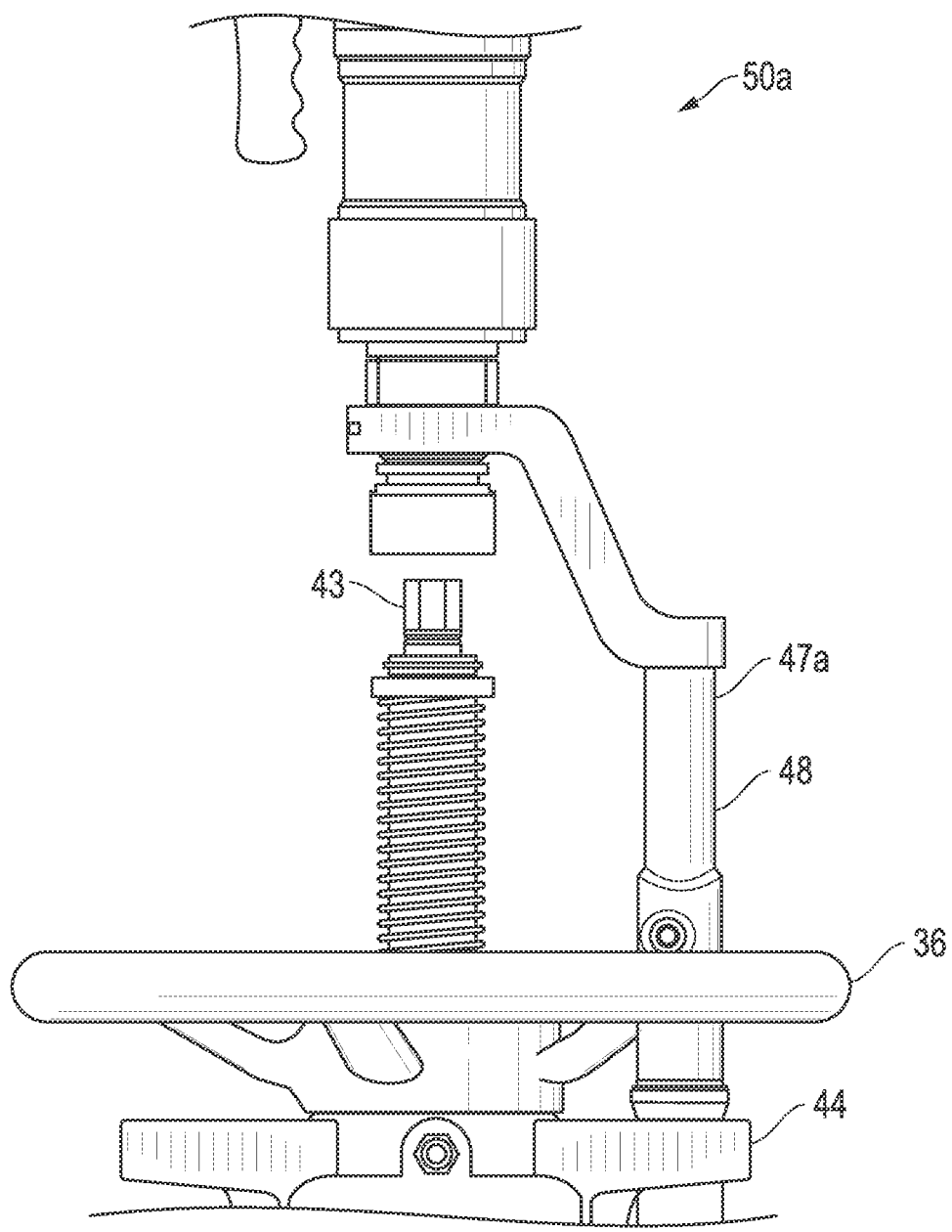
FIG. 10 shows an exemplary embodiment of the pneumatic torque wrench attachment for grinding.

FIG. 9 and FIG. 10 illustrate another exemplary embodiment or setting of a grinding handle 47a for attaching power operated torque wrench. FIG. 9 and FIG. 10 are similar to the exemplary embodiments as illustrated in FIGS. 5 and 6 except that the grinding handle 47a has an updated design with a more uniform external diameter 48 for grinding and, alternatively, to support/brace the reaction foot of torque machine 50a. A further difference as illustrated in FIG. 10

(as compared to FIG. 6) is the utilization of a different torque machine 50a when coupling to plug stem 43.

Figure 11:
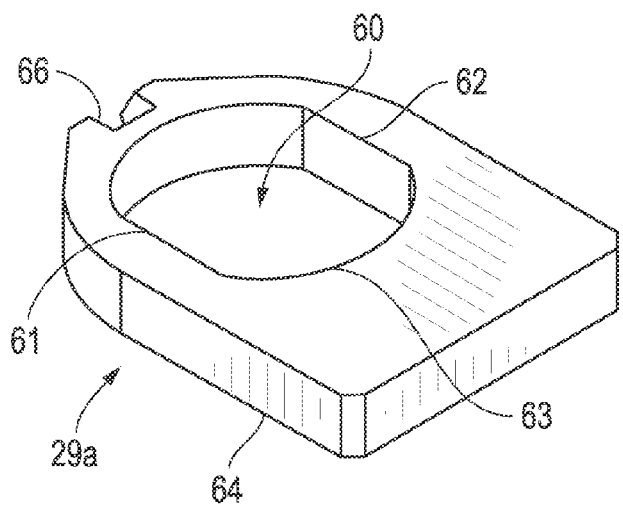
FIG. 11 shows a perspective view of an exemplary embodiment of a stem clamp of an angle valve.
Figure 12:
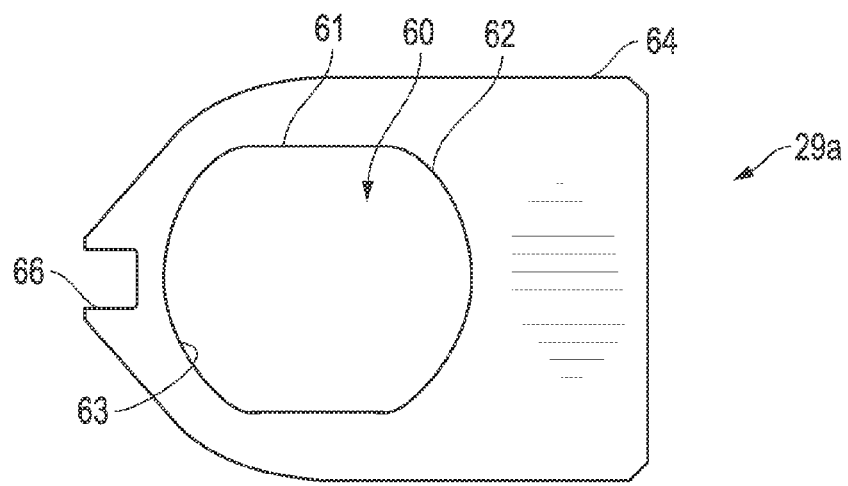
FIG. 12 shows a top view of an exemplary embodiment of the stem clamp of FIG. 11.
Figure 13:
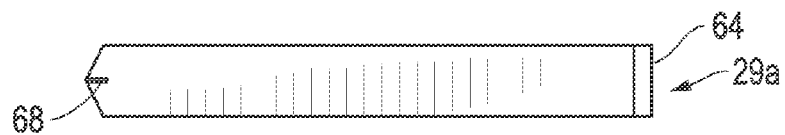
FIG. 13 shows a side view of the exemplary embodiment of the stem clamp of FIG. 12.
Figure 14:
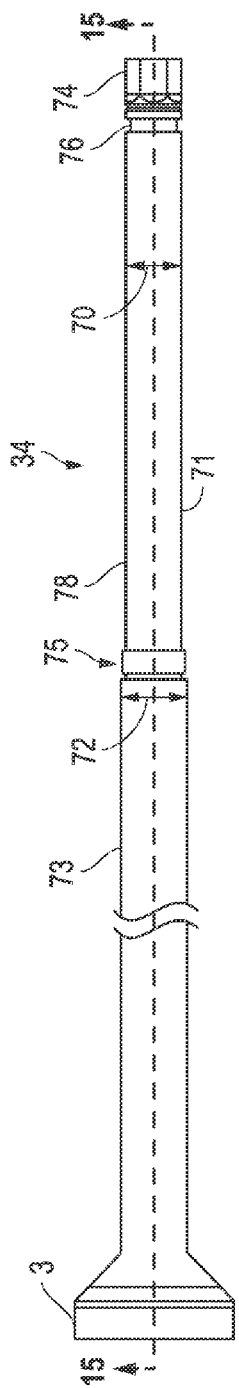
FIG. 14 shows an exemplary embodiment of a stem of an angle valve.
Figure 15:
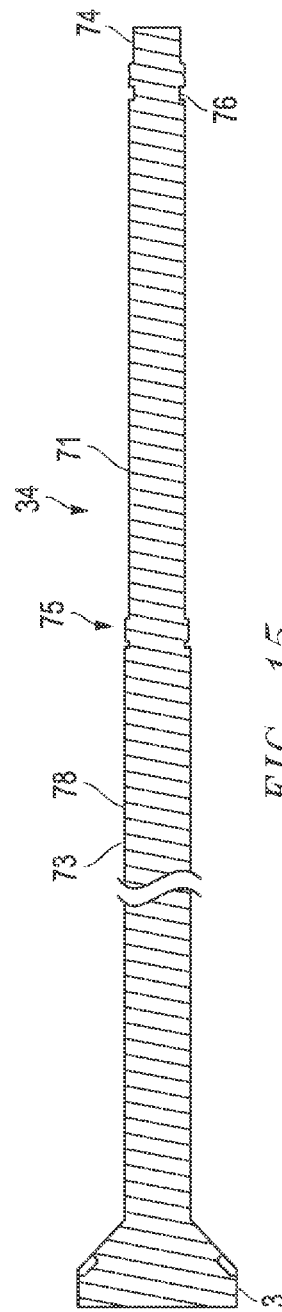
FIG. 15 shows a cross sectioned view taken along line 15-15 of the exemplary embodiment of the stem of FIG. 14.
Figure 17:
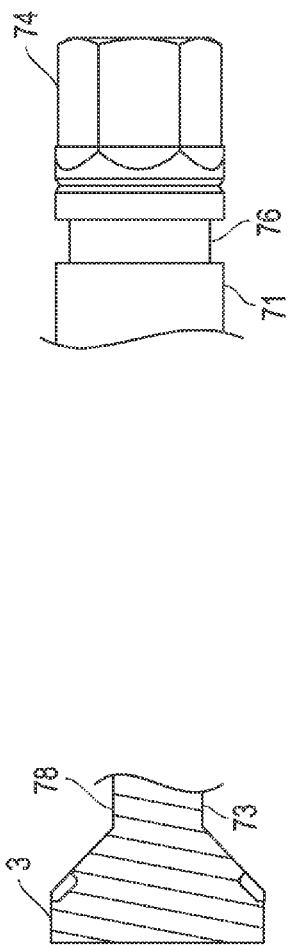
FIG. 17 shows an enlarged view of an exemplary embodiment of the upper end of the stem of FIG. 14.
Figure 16:
FIG. 16 shows an enlarged cross section view of a plug connected to the stem from FIG. 15.

FIGS. 11-13 depict different views of an exemplary embodiment of an anti-rotational component or stem clamp 29a. Stem clamp 29a may have an external surface/perimeter 64 to be guided along matching shaped interior surface/walls defining the cavity of the yoke 24 with the matching shape preventing or inhibiting rotation (see FIGS. 7 and 8, where a portion of external surface 64 of stem clamp 29a matingly meets the interior surface of the yoke 24). The external surface 64 may further define a notch 66 which may engage the stroke scale plate 30. As seen in FIG. 13, from the side view, the external surface 64 may define a groove or pointer 68 which may indicate the position of the plug 3 as the stem clamp 28a travels along the stroke scale plate 30. Stem clamp 29a may further have an opening 60 with a circumference 62 that surrounds and may be tightened against stem sleeve 28. The circumference 62 may have one or more flat surfaces 61 and one or more round surfaces 63 which may matingly engage the lower end flats/surfaces of the stem sleeve 28 (as is depicted in FIGS. 20-23).

FIGS. 14-17 depict different views of exemplary embodiments of a stem 34. As depicted, in one embodiment the stem 34 may be unitary with the plug 3. Alternatively, in another embodiment the stem 34 may be mounted to or otherwise connected to the plug 3 as a separate piece. In addition, the stem 34 may have an external surface 78 with variable diameters 70 and 72. For example, the upper diameter 70 of the upper end 71 of stem 34 may be smaller than the lower diameter 72 of the lower end 73 of stem 34. The upper end 71 of stem 34 may be rotatably housed within the stem sleeve 28 (see, for example, FIGS. 3-4 and 7-8). Further the external surface 78 may define a groove 76 below the head 74 of the stem 34 and may also define a threaded seat 75. The groove 76 may be configured to engage the split collar assembly 23. The threaded nut 22 (or threaded nuts 22a, 22b) may be tightened around threaded seat 75 of the stem 34. The head 74 of the stem 34 may be polygonal (or other engageable) in shape or shape of a socket so as to transfer torque when applied from the handle 7 to the stem 34. Such a head 74 may be integral with the stem 34 as shown or may be a separate piece connected to the stem 34.

Figure 19:
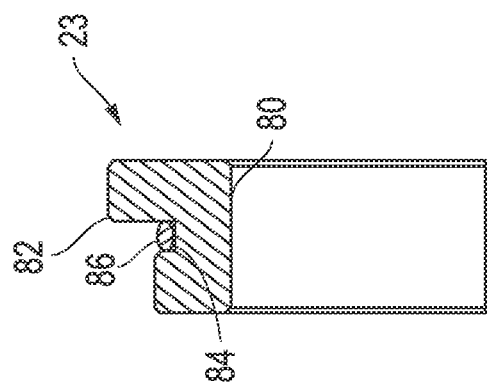
FIG. 19 shows a cross section view taken along line 19-19 of one piece of the exemplary embodiment of the split collar assembly of FIG. 18.
Figure 18:
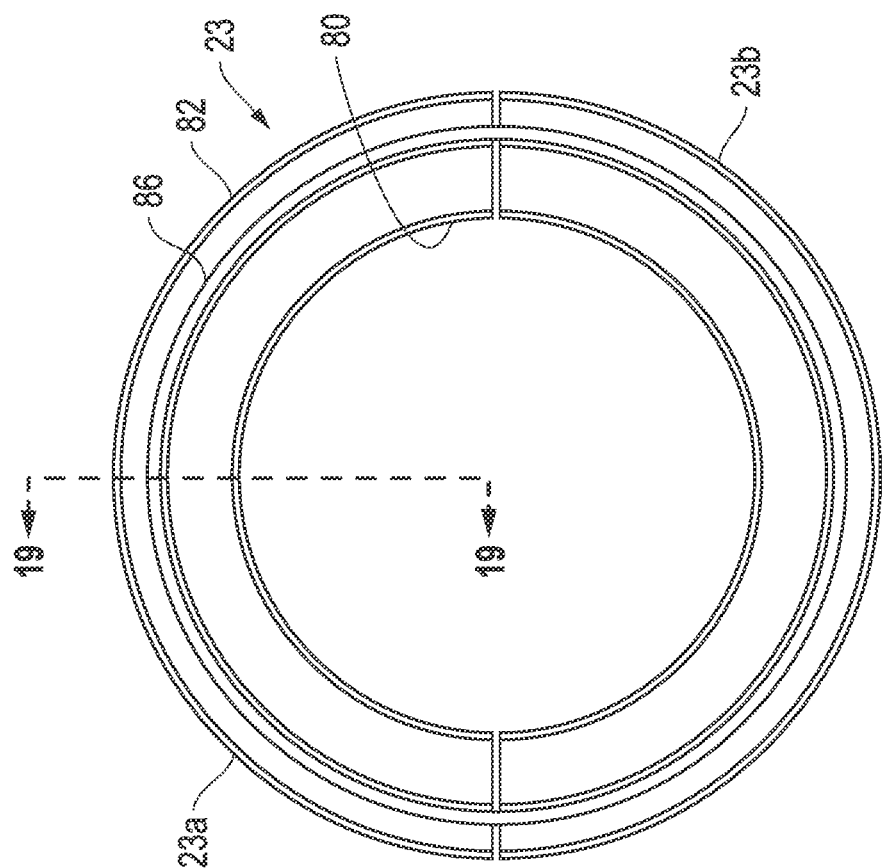
FIG. 18 shows a top view of an exemplary embodiment of a split collar assembly.

FIG. 18 and FIG. 19 depict different views of exemplary embodiments of a split collar assembly 23. The split collar assembly 23 may be formed from multiple pieces 23a and 23b. Although depicted as two pieces 23a and 23b, the split collar assembly 23 may be made up of any number of pieces. The inner circumference 80 of split collar assembly 23 may rest on groove 76 of the stem 34. The outer circumference 82 of the split collar assembly 23 may have a depression 84. A retaining ring 86 may be seated within the depression 84 to hold or retain the multiple split collar assembly pieces 23a, 23b together. By way of example only, commercially available retaining rings 86 may include SMALLEY STEEL RING COMPANY retaining rings. Further, the outer circumference 82 of the split collar assembly 23 may also engage the handle 7.

FIGS. 20-23 depict exemplary embodiments of a stem sleeve 28. The stem sleeve 28 has an internal surface 92 defining a bore 97. The stem 34 may travel rotatably therethrough the bore 97 (i.e. the inner diameter of the bore 97 is such as to allow rotation of the sleeve 28 around the upper end 71 of stem 34 or upper diameter 70 of stem 34). The stem sleeve 28 further has an external surface 90. The external surface 90 may define threads 98 on an upper portion 94 of the sleeve 28 and may define a stem clamp mating surface or flats 96 on the lower portion 95 of the sleeve 28. The stem clamp mating surface 96 engages the opening 60 of the stem clamp 29a. As can be seen in FIGS. 11-13, the opening circumference 62 of the stem clamp 29a defines both flat surfaces 61 and rounded surfaces 63. The stem clamp mating surface 96 of the stem sleeve 28 has complementary flat surfaces 91 and complementary rounded surfaces 93 to engage surfaces 61 and 63, respectively. The complementary flat surfaces 91, 61 and rounded surfaces 93, 63 help to prevent rotation of the stem clamp 29a during operation of the angle valves 20c, 20d.

While the exemplary embodiments are described with reference to various implementations and exploitations, it will be understood that these exemplary embodiments are illustrative and that the scope of the inventive subject matter is not limited to them. Many variations, modifications, additions and improvements are possible. For example, the techniques used herein may be applied to any valve used for piping systems.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

The invention claimed is:

1. An angle valve apparatus having a yoke, a stem traveling through the yoke, a plug at a lower end of the stem, and further wherein the plug is configured to engage a valve seat, comprising:
   a stem sleeve within the yoke, wherein said stem sleeve surrounds the stem at an upper end of the stem opposite the plug, wherein a lower portion of said stem sleeve is configured to motivate movement of the plug;
   a radial bearing located between the stem and said stem sleeve, wherein the radial bearing is configured to allow rotational movement between the stem and said stem sleeve;
   a split collar assembly located on the upper end of the stem;
   a threaded nut on a lower end of the stem, wherein the threaded nut is located below the lower portion of said stem sleeve.

2. The apparatus according to claim 1, further comprising a yoke bushing threaded to an external surface of said stem sleeve, wherein the yoke bushing is housed within the yoke.

3. The apparatus according to claim 2, further comprising a hand wheel coupled to the yoke bushing.

4. The apparatus according to claim 3, further comprising a handle configured to rotate the stem and therefore the plug against scale on the valve seat.

5. The apparatus according to claim 4, further comprising:
   a stem clamp engaging said stem sleeve wherein said stem clamp is configured for anti-rotation of said stem sleeve relative to the stem.

6. A method for grinding scale from a valve seat of an angle valve, wherein the angle valve has a stem, comprising the steps of:
   seating a plug on the valve seat by thrusting a sleeve;
   wherein the step of seating the plug on the valve seat by thrusting the sleeve comprises the steps of:
      driving the sleeve axially;

moving the stem connected to the plug towards the valve seat;

applying a torque to obtain a load between the plug and the valve seat; rotating a hand wheel; and transferring thrust from the sleeve to the stem by a split collar assembly located on the stem and a threaded nut located on the stem;

adjusting the load between the plug and the valve seat to keep the torque toward a maximum possible torque capable of being driven; and rotating the stem inside the sleeve for grinding the valve seat.

7. The method according to claim 6, wherein the steps of applying the torque to obtain the load and adjusting the load comprises the step of applying a torque to a hand wheel.

8. The method according to claim 7, wherein the step of rotating the stem inside the sleeve for grinding the valve seat further comprises the step of:

rotating a handle connected to the stem; and rotating the stem and the plug relative to the sleeve.

9. The method according to claim 6, further comprising the step of preventing rotation of the sleeve while rotating the stem inside the sleeve.

* * * * *